United States Patent [19]

Larker et al.

[11] 3,927,891

[45] Dec. 23, 1975

[54] HIGH PRESSURE SEAL

[75] Inventors: Hans Larker; Jan Nilsson, both of Robertsfors, Sweden

[73] Assignee: Allmanna Svenska Elektriska Aktiebolaget, Vasteras, Sweden

[22] Filed: Apr. 19, 1974

[21] Appl. No.: 462,402

[30] Foreign Application Priority Data

May 7, 1973  Sweden.............................. 7306349

[52] U.S. Cl. ................ 277/190; 277/190; 277/215; 277/70; 277/235
[51] Int. Cl.² ......................................... F16J 15/16
[58] Field of Search ......... 277/190, 191, 70, 75, 76, 277/117–122, 155, 176, 201, 202, 215, 227, 235, 235 R, 235 E

[56] References Cited
UNITED STATES PATENTS

| | | | |
|---|---|---|---|
| 387,900 | 8/1888 | Mills ................................. | 277/117 |
| 643,341 | 2/1900 | White et al. ........................ | 277/118 |
| 1,196,652 | 8/1916 | Brignoni ............................ | 277/117 |
| 2,844,426 | 7/1958 | Glaser.............................. | 277/235 A |
| 3,833,227 | 9/1974 | Nilsson ............................. | 277/190 |

*Primary Examiner*—Richard E. Aegerter
*Assistant Examiner*—L. Footland

[57] ABSTRACT

In a high pressure press which has a seal holder, a high pressure seal is provided between the wall of a high pressure cylinder and a die or an axially movable plunger projecting into the cylinder, which is composed of two sealing rings, one of which has an outer surface abutting the cylindrical wall and an end surface abutting the seal holder, while the other ring has a cylindrical surface abutting the plunger and a surface abutting the seal holder. The portion of the outer surface of the first ring abutting the cylindrical wall which is nearest to the seal holder is provided with generally longitudinally extending draining channels therein.

7 Claims, 8 Drawing Figures

A-A

B-B

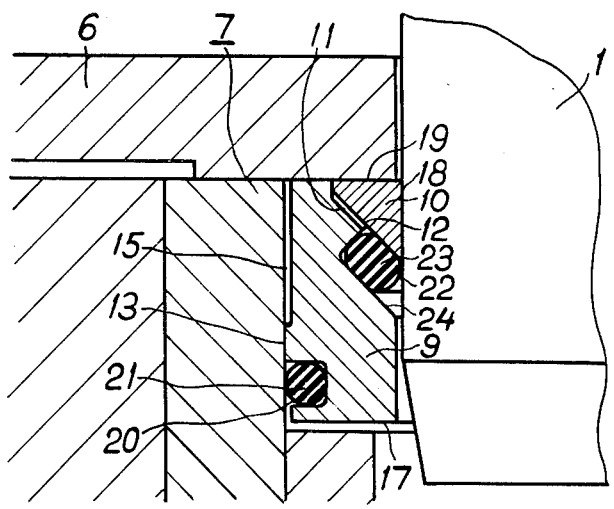
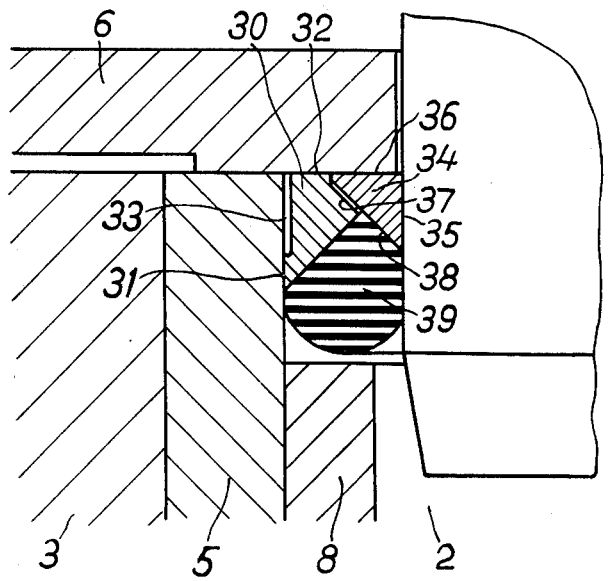
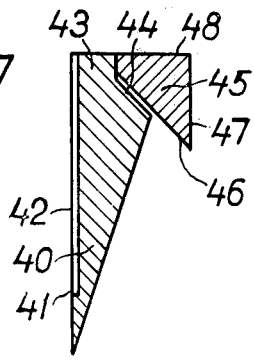
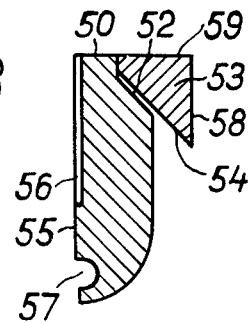

HIGH PRESSURE SEAL

BACKGROUND OF THE INVENTION

1. Field of the Invention

The invention relates to a high pressure seal for a high pressure cylinder in a high pressure press intended for hydrostatic extrusion.

2. The Prior Art

During hydrostatic extrusion, the work is carried out at very high pressure levels; usually the working pressure is between 10 and 20 kbar. In commercial presses a reliable seal of great duration must be effected at such high pressures between the inner wall of a cylinder and a movable plunger and an easily removable and insertable die, respectively. The inner diameter of the cylinder at the highest working pressure is from 0.5 to 1 per cent higher than at atmospheric pressure. In the Swedish printed patent application 350,817, a seal for an extrusion press for hydrostatic extrusion is further described, which seal gives a good result but is unfortunately sensitive to surface damage to the inner surface of the liner. This surface damage arises in the event of temporary leakages of pressure medium between the sealing ring and the liner. Because of the high pressure, the velocity of the pressure medium will be high and the liner will be subjected to severe erosion damage in case of leakage, which, on the one hand, makes the sealing difficult and, on the other hand, causes a likelihood of fracture which shortens the life of the liner. An exchange of a liner is expensive. An exchange of a damaged sealing ring, on the other hand, is less expensive. Probably the sealing rings used so far do not always abut the liner with their entire outer surface. It is likely a leakage is due to the fact that the presure medium sometimes penetrates in between the liner and the sealing ring at the interior part of the sealing ring, and that the sealing ring and the liner only make contact with each other at the extreme part of the sealing ring. Leakage will then result in a great pressure drop in a short distance, a high rate of flow and consequently grave erosion damage even if the amount of liquid leaking out is insignificant.

SUMMARY OF THE INVENTION

According to the invention, a sealing ring held by a seal holder and sealing against a liner of a high pressure cylinder is provided with shallow draining channels in the surface of the outer part of the ring facing the liner. The ring then has a smooth contact surface in the annular portion located furthest away from the seal holder. The object of these draining channels is to ensure that the pressure on the outer side of the sealing ring is lower than the liquid pressure on the inside of the sealing ring. In this way it is made certain that the portion of the sealing ring remote from the seal holder is always in good contact with the inner surface of the liner at all pressures. The invention thus provides a well-defined sealing zone. If leakage should occur, a long flow path is obtained. When the draining arrangement is suitably dimensioned, such a high pressure drop can be achieved across the draining zone that serious erosion damage in the sealing zone can be avoided. Another advantage derived from the invention is that sealing rings of great height will operate better than before. It is thus possible to choose freely the height of the sealing ring. In case of damage by erosion in the sealing ring zone of the liner, a higher sealing ring can be chosen and the sealing zone can be moved inward to an undamaged section, thus postponing an exchange of the liner. The draining arrangement also makes it possible to use sealing rings of great thickness in their innermost portion, and it thus becomes possible to give the rings such a shape that they are able to absorb considerable axial forces. This is a great advantage in the case of extrusion presses.

BRIEF DESCRIPTION OF THE DRAWINGS

The invention will be further explained with reference to the accompanying drawings, in which it is applied for sealing between a fixed and a movable part in a high pressure press.

FIGS. 6 to 8 show alternative embodiments of the seal.

DESCRIPTION OF THE PREFERRED EMBODIMENTS

Figure 1:
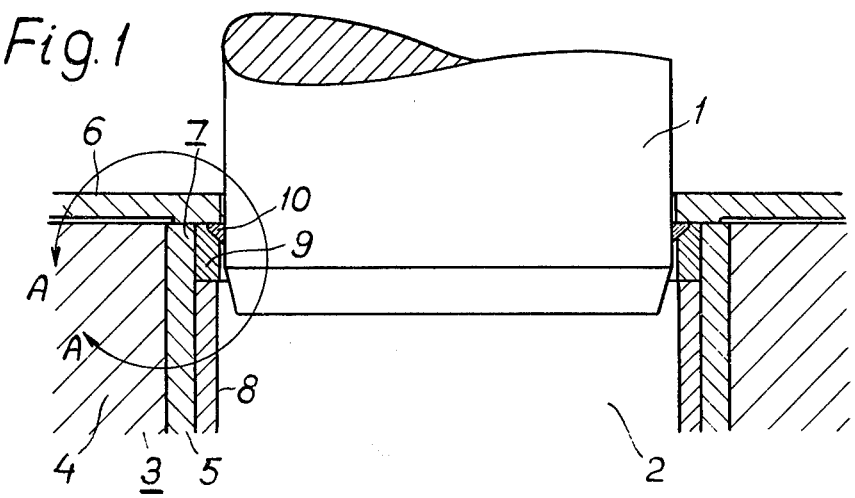
FIG. 1 shows a section through one end of a high pressure chamber with a plunger projectable into a high pressure cylinder for generating a pressure in a pressure medium required for hydrostatic extrusion, FIG. 2 on a larger scale shows the section encircled by A—A in FIG. 1.

In the figures, 1 designates a movable plunger which is shown partly projecting into the pressure chamber 2 which is surrounded by a high pressure cylinder 3. This high pressure cylinder comprises a tube wall 4 which may be built up in a conventional manner of a tube and prestressed strips wound around the tube, and an exchangeable liner 5. The cylinder is provided with end pieces 6 forming seal holders. Between the liner 5 and the plunger 1 is a seal 7. Inside the liners 5 there is a sleeve 8 which, on the one hand, forms a protection for the liner and, on the other hand, forms a spacer preventing the seal 7 from being pushed into the high pressure cylinder.

Figure 2:
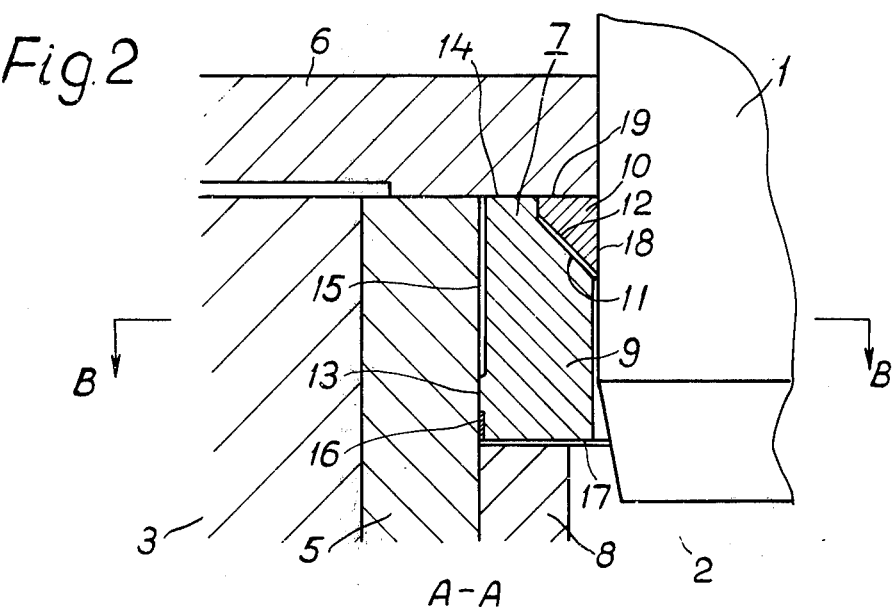
Figure 3:
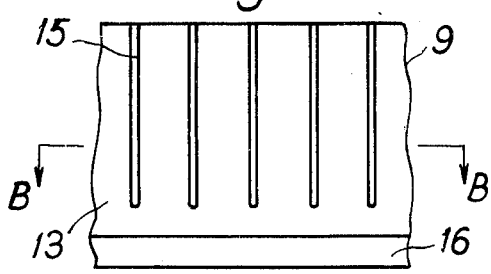
FIG. 3 is a side view of the sealing ring according to FIG. 2.
Figure 4:
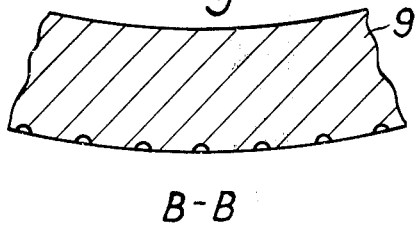
FIG. 4 is a radial section through the sealing ring according to FIGS. 2 and 3 taken at B—B as indicated in the figures. Finally.

In the embodiment according to FIGS. 1 to 4, the seal consists of a first sealing ring 9 with relatively great axial extension and substantially rectangular cross-section, and a seond sealing ring 10 with substantially triangular cross-section with substantially the same shape and size as a recess at one corner of the first sealing ring. Both rings are of hard metal. The inclined surface 11 of the recess and the inclined surface 12 of the ring 10 face each other and have substantially the same angle of inclination. Under low pressure in the cylinder, they are able to make contact with each other. The outer cylindrical surface 13 of the first ring seals against the liner 5 and its outer end surface 14 against the seal holder 6. The outer portion of the surface 13 is provided with axial draining grooves 15 which guarantee that sealing is effected at the inner part of the ring 9, which, in order to improve the sealing properties, may be coated with an annular layer 16 of a metal which is softer than the material in the ring itself. A steel ring can advantageously be coated with copper. The inner end surface 17 of the ring is plane.

The draining grooves 15 do not necessarily have to be axially directed, but must extend generally longitudinally. They can be obliquely directed in relation to the axial plane. Crossed grooves can be obtained by knurling the surface 13. A knurled surface causes a high and even pressure drop and slight erosion damage to the liner in case of leakage.

In the embodiment according to FIGS. 1 to 4 sealing is effected by metallic sealing rings only. FIG. 5 shows an alternative embodiment of the previously described seal. The sealing ring 9 is provided with an outer annular slot 20 in which an O-ring 21 of elastomeric material such as rubber is inserted. The ring 9 in this case is provided with a second inclined surface 24 as well, which is parallel to the surface 11. In this way an annular slot 22 is formed between the rings 9 and 10. In this slot a sealing ring 23 is placed which bridges the gap between the surfaces 11 and 12 and also makes contact with the plunger 1.

The sealing ring 9 described above is able to absorb considerable axial forces without being damaged. The seal is extremely advantageous for extrusion presses of the kind described in U.S. Pat. No. 3,751,958, in which a unit comprising a mandrel and a sleeve taking up forces acting on the mandrel is permanently arranged in the high pressure cylinder of the press. This unit is subjected to axial forces when a billet is inserted and the pressure chamber closed. The sealing rings described are able to absorb these forces and can thus be utilized to fix the unit axially in the high pressure cylinder of the pressure chamber.

FIGS. 6 to 9 show embodiments which are applicable when the sealing ring does not have to take up axial forces of any mentionable magnitude from construction elements inside the high pressure cylinder. FIG. 6 shows a seal of conventional cross-section constructed according to the invention. The seal comprises a first sealing ring 30 with an outer cylindrical surface 31 sealing against the liner 5 and a plane surface 32 sealing against the sealing holder 6. The outer surface of the ring is provided with draining grooves 33 in the section nearest the surface 32. The other sealing ring 34 has an inner cylindrical surface 35 sealing against the plunger 1 and a plane surface 35 sealing against the sealing holder 6. The sealing ring 30 has a recess with an inclined surface 37 directed toward the center line of the ring, said surface facing the inclined surface 38 of the ring 34. A sealing ring 39 of elastomeric material bridges the gap between the inclined surfaces 37 and 38 of the rings 30 and 34 and makes contact with the wall of the liner 5 and the surface of the plunger 1 in a sealing manner.

FIG. 7 shows an alternative embodiment with a substantially triangular sealing ring 40 of great height. Its inner corner will then be very acute-angled and its outer cylindrical surface 41 high and the draining channels 42 long. As before the ring has a plane sealing surface 43 making contact with the sealing holder 6 in the high pressure cylinder. Also as before the ring has a recess with an inclined surface 44 which faces the inclined surface 46 of the other sealing ring 45. This latter ring has also a cylindrical sealing surface 47 and a plane sealing surface 48.

FIG. 8 shows a further embodiment with a first, high sealing ring 50 with considerably less thickness than the height of the gap between the liner 5 and the plunger 1. The ring has a substantially rectangular cross-section with a recess having an oblique surface 52 facing the oblique surface 54 of the other sealing ring 53. As in previously described seals, the cylindrical surface 55 of the first sealing ring is provided with draining channels 56 but is also provided with an annular slot 57 at the inner part of the ring for a sealing ring (not shown). Like the corresponding ring in the previously described seals, the ring 53 has a cylindrical surface 58 and a plane surface 59 sealing against the plunger 1 and against the sealing holder 6, respectively.

The axial extension of the draining channels is at least 50 per cent of the height of the ring, and the ring has in the portion furthest from the seal holder, a smooth outer surface, the height of which is at least 10 per cent of the total height of the ring.

We claim:

1. In a high pressure press, a seal assembly comprising a high pressure cylinder with a wall, a die or axially movable plunger projecting into the high pressure cylinder, a seal holder at the end of the high pressure cylinder, first and second sealing rings of metal, the first ring having an outer surface abutting the cylinder wall and an end surface abutting the seal holder, and the second ring having a cylindrical surface abutting the die or plunger and a surface abutting the seal holder, the first ring having grooves in the outer surface thereof forming draining channels therein extending generally longitudinally in the area nearest the seal holder.

2. High pressure seal according to claim 1, in which the axial extension of the draining channels is at least 50 per cent of the height of the ring.

3. High pressure seal according to claim 1, in which the portion of the outer surface of the first sealing ring furthest from the seal holder has a smooth surface, the height of which is at least 10 per cent of the whole height of the ring.

4. High pressure seal according to claim 1, in which the first sealing ring on its interior is provided with an annular slot, and an elastomeric sealing ring in said slot.

5. High pressure seal according to claim 1, in which the portion of the outer surface of the first sealing ring furthest from the seal holder is coated with a material which is softer than the material of the sealing ring.

6. High pressure seal according to claim 1, in which the first sealing ring has an inclined surface facing towards the center line of the ring and the second sealing ring has an inclined surface facing towards the inclined surface of the first sealing ring with substantially the same angle of inclination.

7. High pressure seal according to claim 6, having a sealing ring of elastomeric material bridging the gap between the said inclined surfaces.

* * * * *